(12) United States Patent
Guim Bernat et al.

(10) Patent No.: US 11,704,424 B2
(45) Date of Patent: *Jul. 18, 2023

(54) EDGE CLOUD DATA PROTECTION

(71) Applicant: Intel Corporation, Santa Clara, CA (US)

(72) Inventors: Francesc Guim Bernat, Barcelona (ES); Mark Schmisseur, Phoenix, AZ (US); Kshitij Doshi, Tempe, AZ (US); Kapil Sood, Portland, OR (US); Tarun Viswanathan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/386,015

(22) Filed: Jul. 27, 2021

(65) Prior Publication Data

US 2021/0357520 A1 Nov. 18, 2021

Related U.S. Application Data

(63) Continuation of application No. 16/143,724, filed on Sep. 27, 2018, now Pat. No. 11,157,642.

(51) Int. Cl.
| | |
|---|---|
| *G06F 21/62* | (2013.01) |
| *G06F 21/60* | (2013.01) |
| *H04L 9/08* | (2006.01) |
| *H04L 67/12* | (2022.01) |
| *H04W 12/08* | (2021.01) |
| *H04W 12/02* | (2009.01) |
| *H04L 9/40* | (2022.01) |

(52) U.S. Cl.
CPC ........ *G06F 21/6218* (2013.01); *G06F 21/602* (2013.01); *H04L 9/083* (2013.01); *H04L 9/085* (2013.01); *H04L 9/0891* (2013.01); *H04L 9/0894* (2013.01); *H04L 63/0442* (2013.01); *H04L 67/12* (2013.01); *H04W 12/02* (2013.01); *H04W 12/08* (2013.01); *H04L 2209/805* (2013.01)

(58) Field of Classification Search
CPC ... G06F 21/602; G06F 21/6218; H04L 67/12; H04L 9/085; H04L 9/0894; H04L 63/0442; H04L 9/083; H04L 9/0891; H04L 2209/805; H04W 12/02; H04W 12/08
USPC .......................................................... 726/26
See application file for complete search history.

(56) References Cited

U.S. PATENT DOCUMENTS

| | | | |
|---|---|---|---|
| 7,577,838 | B1 | 8/2009 | Rossmann |
| 9,064,131 | B2 * | 6/2015 | Lim ........................ H04L 63/06 |
| 2015/0121487 | A1 | 4/2015 | Chastain et al. |
| 2017/0171298 | A1 * | 6/2017 | Jambur Sathyanarayana .............. H04L 67/10 |

(Continued)

OTHER PUBLICATIONS

Non-Final Office Action for U.S. Appl. No. 16/143,724, dated Jan. 7, 2021, 12 pages.

(Continued)

*Primary Examiner* — Benjamin A Kaplan
(74) *Attorney, Agent, or Firm* — Jordan IP Law, LLC

(57) ABSTRACT

An embodiment of a semiconductor apparatus may include technology to receive data with a unique identifier, and bypass encryption logic of a media controller based on the unique identifier. Other embodiments are disclosed and claimed.

19 Claims, 7 Drawing Sheets

(56) References Cited

U.S. PATENT DOCUMENTS

2019/0109848 A1  4/2019  Clark et al.
2019/0245848 A1  8/2019  Divoux et al.

OTHER PUBLICATIONS

Notice of Allowance for U.S. Appl. No. 16/143,724, dated Jun. 9, 2021, 9 pages.

* cited by examiner

EDGE CLOUD DATA PROTECTION

CROSS REFERENCE TO RELATED APPLICATIONS

The present application is a continuation of and claims the benefit of priority to U.S. Non-Provisional patent application Ser. No. 16/143,724 filed on Sep. 28, 2018.

TECHNICAL FIELD

Embodiments generally relate to memory and storage systems. More particularly, embodiments relate to edge cloud data protection.

BACKGROUND

Edge devices may include remote client devices such as sensors, cameras, internet-of-things (IoT) devices, etc. In some applications, edge devices may be part of an edge cloud environment where numerous edge devices are in communication with various storage and/or processing platforms.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by JEDEC, such as JESD79F for double data rate (DDR) SDRAM, JESD79-2F for DDR2 SDRAM, JESD79-3F for DDR3 SDRAM, J ESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
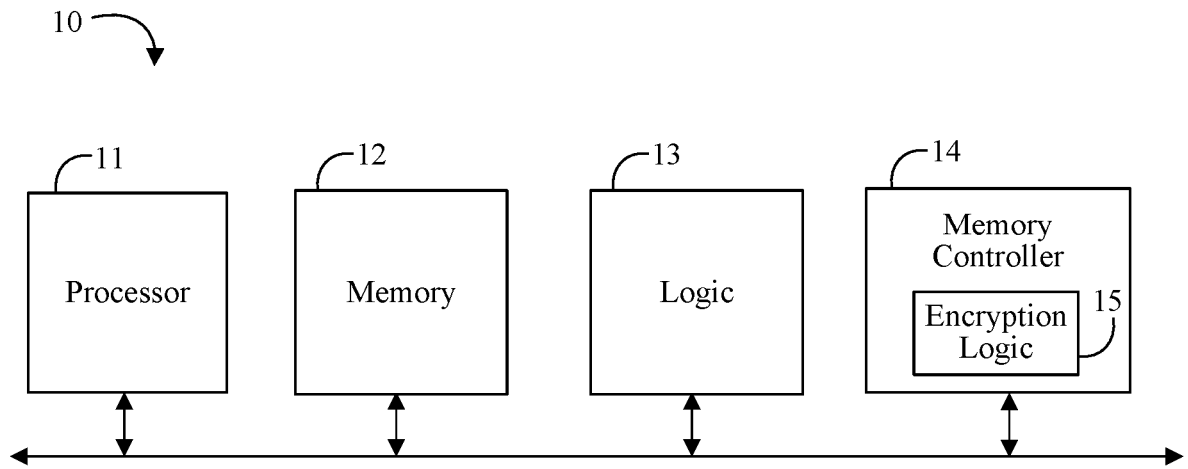
FIG. 1 is a block diagram of an example of an electronic processing system according to an embodiment.

Turning now to FIG. 1, an embodiment of an electronic processing system 10 may include a processor 11, memory 12 communicatively coupled to the processor 11, a memory controller 14 communicatively coupled to the processor 11 and the memory 12 to control access to the memory 12, the memory controller 14 including encryption logic 15 to encrypt at least a portion of the memory 12, and logic 13 communicatively coupled to the memory controller 14 to receive data with a unique identifier, and bypass the encryption logic 15 of the memory controller 14 based on the unique identifier. In some embodiments, the logic 13 may be further configured to register a private key associated with the unique identifier. For example, the logic 13 may also be configured to decrypt the data with the private key associated with the unique identifier. For example, the private key may be a customer/tenant key, so the infrastructure owner cannot see the key. In some embodiments, the logic 13 may be further configured to store a plurality of private keys respectively associated with a plurality of unique identifiers. In some embodiments, logic 13 may be further configured to specify a memory operation type to the memory controller 14 to write the data to the memory 12 without further encryption. In any of the embodiments herein, the unique identifier may correspond to a process application system identifier (PASID). For example, the logic 13 may be configured to share a private key associated with the PASID with an edge device, a storage platform, and an execution platform (e.g., the storage platform and execution platform may be on a same server device which is remote from the edge device). In some embodiments, the unique ID may correspond to a PASID but may also be assigned by an independent identity management system (e.g., blockchain-based) that may be then mapped to the PASID or to the one or more private keys. In some embodiments, the encryption logic 15 and/or the logic 13 may be located in, or co-located with, various components, including the processor 11 and/or the memory controller 14 (e.g., on a same die).

Embodiments of each of the above processor 11, memory 12, logic 13, memory controller 14, encryption logic 15, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, etc. Embodiments of the memory controller 14 may include a general purpose controller, a special purpose controller, a media controller, a storage controller, a micro-controller, a general purpose processor, a special purpose processor, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, receiving the data with the unique identifier, bypass the encryption logic based on the unique identifier, etc.).

Figure 2:
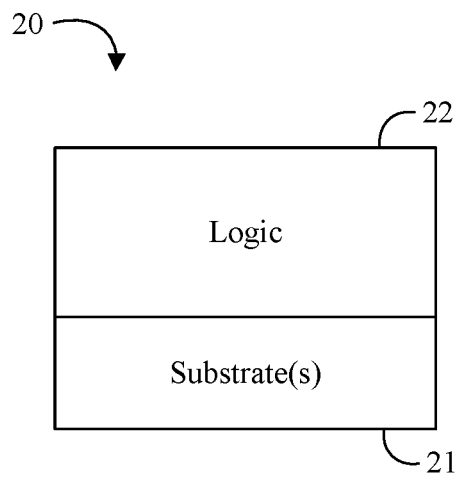
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to receive data with a unique identifier, and bypass encryption logic of a media controller (e.g., a memory controller, a storage controller, etc.) based on the unique identifier. In some embodiments, the logic 22 may be further configured to register a private key associated with the unique identifier. For example, the logic 22 may be configured to decrypt the data with the private key associated with the unique identifier. In some embodiments, the logic 22 may be further configured to store a plurality of private keys respectively associated with a plurality of unique identifiers. In some embodiments, the logic 22 may also be configured to specify a media operation type to the media controller to store the data without further encryption. In any of the embodiments herein, the unique identifier may correspond to a PASID. For example, the logic 22 may be configured to share a private key associated with the PASID with an edge device, a storage platform, and an execution platform. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figures 3A, 3B, 3C:
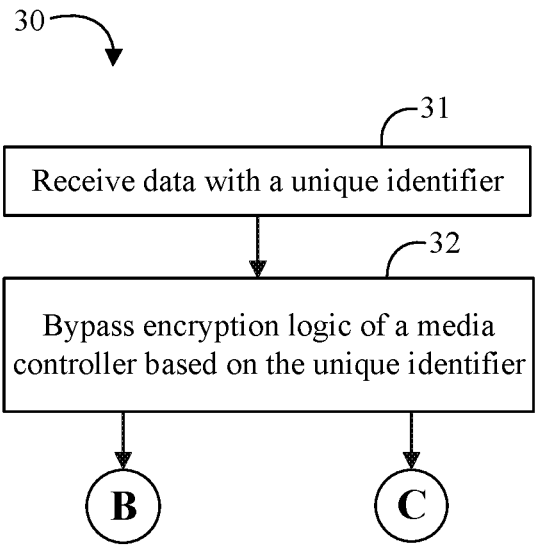
FIGS. 3A to 3C are flowcharts of an example of a method of controlling a media according to an embodiment.

Turning now to FIGS. 3A to 3C, an embodiment of a method 30 of controlling a media may include receiving data with a unique identifier at block 31, and bypassing encryption logic of a media controller based on the unique identifier at block 32. Some embodiments of the method 30 may further include registering a private key associated with the unique identifier at block 33. For example, the method 30 may include decrypting the data with the private key associated with the unique identifier at block 34. The method 30 may also include storing a plurality of private keys respectively associated with a plurality of unique identifiers at block 35. Some embodiments of the method 30 may further include specifying a media operation type to the media controller to store the data without further encryption at block 36. In any of the embodiments herein, the unique identifier may correspond to a PASID at block 37. For example, the method 30 may include sharing a private key associated with the PASID with an edge device, a storage platform, and an execution platform at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 21 to 27 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for improved or optimized data protection, and scale-out data protection in edge cloud environments. For example, some embodiments may remove costly CPU and memory overheads that arise in communications between internet-of-things (IoT) devices and edge servers, and which lead to increases in latency in processing of very time sensitive requests. Data produced from IoT systems may be growing at high rates. Some systems may have ultra low latency response requirements which may drive growth in mobile edge clouds. Also, robust data protection may be necessary or beneficial to many applications, particularly as edge computing may present an attractive target for malefactors. For example, some of the edge may not be protected by tamper-proof high quality physical surveillance. Both customer self-interest and legal obligations may increase the need/desire for data to be stored in encrypted forms.

Some systems may encrypt all data residing on the edge devices. Each edge device may send data to edge application servers in encrypted form. For example, the edge device may open an TLS/SSL/QUIC channel and then use TLS/SSL encryption to send data to the edge server for processing over that channel. The receiving server may decrypt and operate on the decrypted data, and then when the server needs to commit the data to disk storage, re-encrypt the data using some appropriate key. The encryption keys in each of these encryption processing steps remain separately protected and are available only to the authorized owner of the data (e.g., one key for the edge device, another key for the server, etc.).

Some systems may further address concerns over security in multi-tenant environments to ensure that data is also protected from sophisticated attacks by using encryption even when data is in an execution environment (e.g., DRAM). Non-limiting examples of such memory encryption technology include AMD SECURE ENCRYPTED VIRTUALIZATION (SEV), INTEL SOFTWARE GUARD EXTENSIONS (SGX), total memory encryption (TME), and multi-key TME (MKTME). These technologies may provide hardware-based protection for data that reaches the application servers. A problem may occur because data that reaches the server over a secure channel has to be converted back to normal (e.g., unencrypted data). In a server that uses MKTME, for example, this clear text data then again gets reconverted to in-memory encrypted format for security. In other words, multiple decryption-encryption cycles may be performed. Decryption of the data coming over the secure channel costs not just a considerable amount of CPU overhead, but it also requires at least one copy, and often two copies (e.g., unless the CPU can decrypt the data while it is in receive buffers to avoid the second copy, which may be difficult to achieve in a multi-tenant, security conscious environment). In addition to the above CPU and memory overheads, caches get thrashed, and memory bandwidth is expended. Moreover, in some IoT applications, a very small amount of data needs to be actually touched by the CPU. For example, a significant portion of IoT data is vacated from memory to disk without further processing by the CPU. In some other platforms/servers, when the data is decrypted in an SSL channel, every byte must be touched at least once (e.g., which causes CPU cache and page cache pollution, as well).

Some embodiments may advantageously bypass one or more of the foregoing overhead problems by unifying MKTME protection and TLS/SSL transport security protection. Removing these overheads may limit the latency burdens to the actual cost of performing computations (e.g., with any encrypt/decrypt done by the MKTME hardware on the fly and therefore "free" of the CPU and memory/cache pollution due to copying). Some embodiments may also reduce the remaining burdens so that they are only proportional to the amount of data actually examined by the CPU (e.g., which may typically be a fraction). If the bulk of the data arriving at the server need not even be looked at, then some embodiments may enable the data to go directly to storage, which may dramatically reduce the memory impact.

Figure 4:
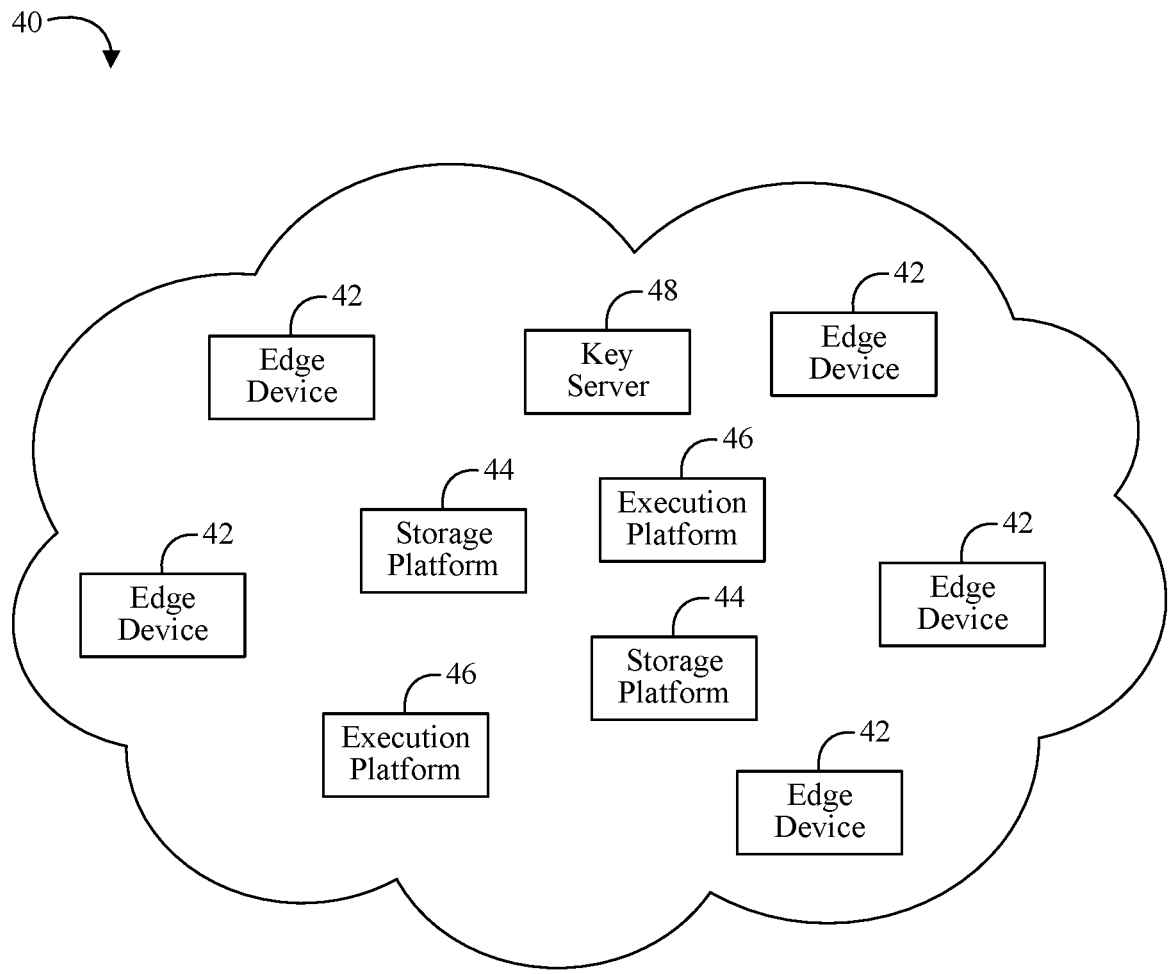
FIG. 4 is a block diagram of an example of an edge cloud environment according to an embodiment.

Turning now to FIG. 4, an embodiment of an edge cloud environment 40 may include one or more edge device(s) 42, one or more storage platform(s) 44, one or more execution platform(s) 46, and a key server 48, all of which may be communicatively coupled to each other (e.g., wired or wirelessly). The components of the environment 40 may all be distinct devices, or one or more of the devices may share the same underlying hardware (e.g., a storage platform 44 and an execution platform 46 may be implemented on the same server). The key server 48 (e.g., which may be a process or application running in an edge gateway or anywhere else in the edge cloud environment) provisions ephemeral private keys on demand, to the edge device(s) 42. The same keys are supplied to, and registered with, some local secure store at each computing host in the edge cloud (e.g., the storage platform(s) 44, the execution platform(s) 46, etc.) that needs to process the data from the edge device(s) 42. The private keys so provisioned may be securely delivered where needed. For example, the private keys may be delivered over a secure transport (e.g., TLS, SSL) or the private keys may be wrapped in public keys of the respective recipients (e.g., an edge device 42, a server, etc.). The keys may also be generated ahead of time and provisioned using any suitable key generation and provisioning technology. For example, key generation/provisioning may be performed when an edge device 42 gets initialized or, for a mobile edge device, when the edge device 42 joins the edge operations.

Figure 5A:
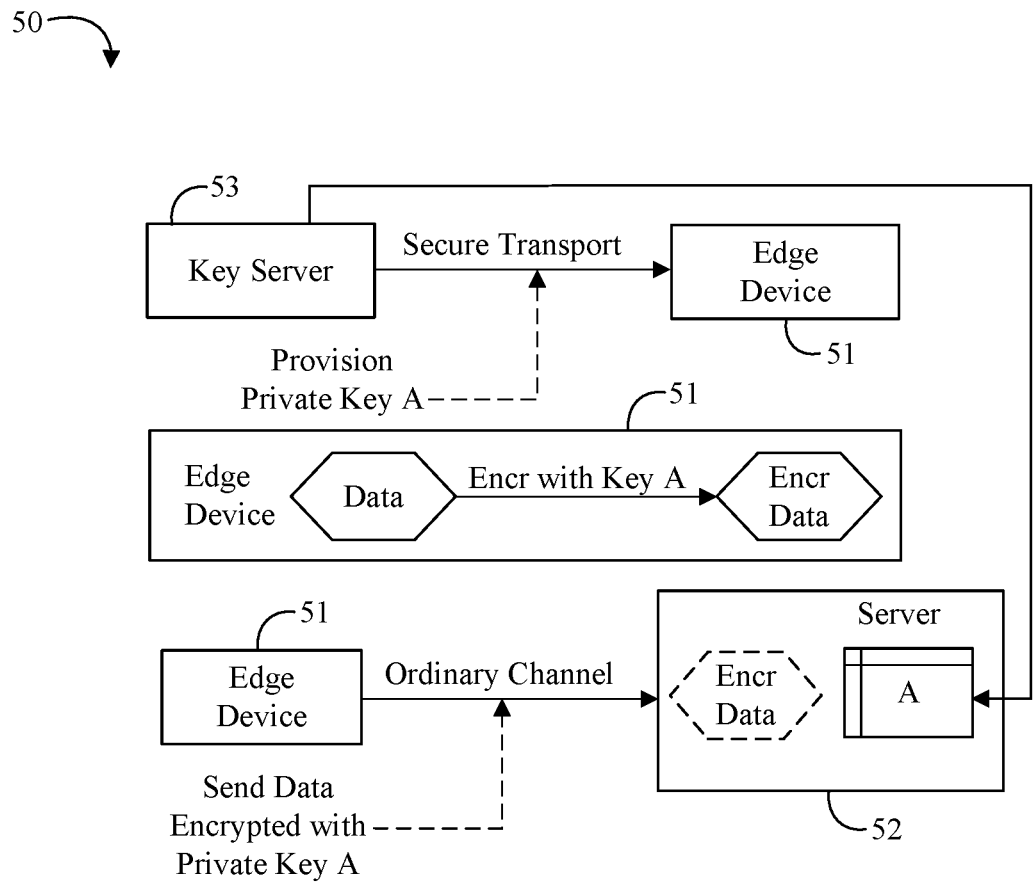
FIGS. 5A to 5C are illustrative diagrams of an example of a process flow for unifying encryption for an edge cloud environment according to an embodiment.
Figure 5B:
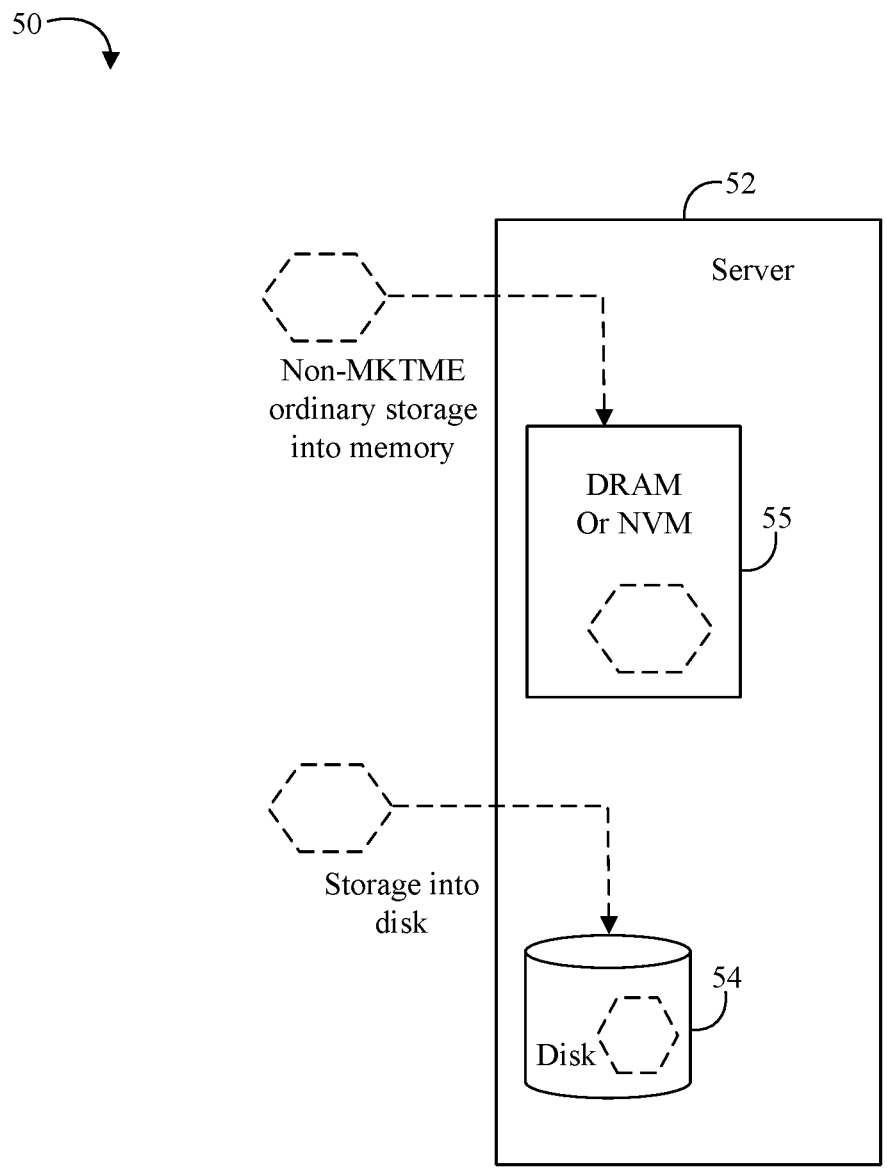
Figure 5C:
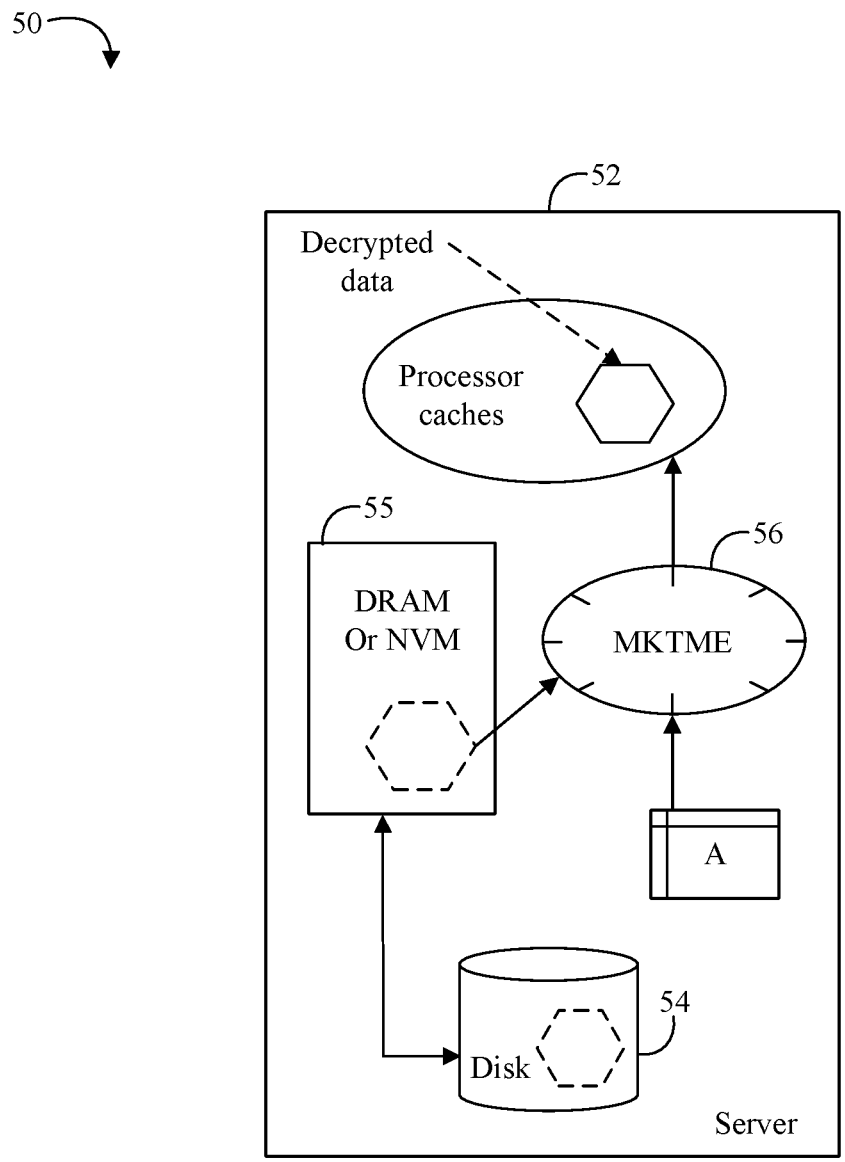

Turning now to FIGS. 5A to 5C, an embodiment of a process flow 50 for unifying encryption for an edge cloud environment may include aspects performed by an edge device 51, a storage platform on a server 52, an execution platform on the server 52, and/or a key server 53. As shown in FIG. 5A, the key server 53 may provision a private key A over a secure transport to the edge device 51 and the server 52. The edge device 51 may then encrypt the data produced by the edge device 51 using the private key A to create encrypted data. When the edge device 51 is ready to send the encrypted data to the server 51, the edge device 51 may advantageously send the encrypted data using non-encrypted transport technology (e.g., the encrypted data may also be integrity protected using any suitable digest of choice). In some embodiments, the edge device 51 may include MKTME technology, similar to what may be included on the server 52, and may not incur any overhead for performing such encryption.

FIG. 5B shows an example of data arrival and storage into a memory disk 54 on the server 52 (e.g., a storage platform aspect of the server 52). When encrypted data protected as shown in FIG. 5A reaches the server 52, the encrypted data may be given a cache bypass and stored directly into the encrypted memory 55 or disk 54 on the server 52, without a decryption step. Non-MKTME data (e.g., or data not otherwise identified as having an associated private key provisioned from the key server 53), may be handled as ordinary storage with a decryption step prior to moving the data into memory on the server 52 (e.g., following the server's MKTME encryption process).

FIG. 5C shows the process flow 50 during an application process (e.g., an execution platform aspect of the server 52). The encrypted data may be decrypted at the time that a processor/CPU accesses the data, and may be automatically updated in encrypted form. When the data needs to be accessed by an application, an MKTME engine 56 in the server 52 may utilize the private key A provided to the server 52 by the key server 53 (e.g., registered into the server 52), to automatically work with the data. Advantageously, no CPU or cache bandwidth is wasted at the application server 52 in the edge cloud environment. In some embodiments, a key registry may be replicated across multiple application servers, and data replicated or maintained in a shared access storage, for higher availability. For example, such replication may also bypass the decrypting and re-encrypting overheads because data may already be provided and stored in the ready-for-MKTME encrypted form.

Some embodiments may also address various regulatory requirements (e.g., such as the European General Data Protection Regulation (GDPR)), because secure wipe of data may be performed by the revocation of the associated private key that was used for data encryption and MKTME encryption. In some embodiments, each tenant/consumer connecting to the edge cloud environment may be able to provision their own key(s). For example, a secure wipe of a tenant's data may be performed by revoking individual tenant keys.

Some embodiments may advantageously allow scale out data encryption. For example, by piggybacking on edge devices and not in the edge platform some embodiments may allow hardware provisions like MKTME in the edge devices to be leveraged in the process. Some embodiments may reduce latency seen by services. For example, latency may be reduced by saving many different layers of data processing that are otherwise used to encrypt and decrypt data. Some embodiments may provide greater flexibility for an edge architecture. For example, some embodiments may map one or more keys to one single tenant and create more complex data provider and consumer architectures. Some embodiments may improve a total cost of ownership by using resources more effectively and removing tasks and computation that may be duplicative or unneeded. Some embodiments may also help address privacy concerns and/or regulatory requirements in an efficient manner.

Figure 6:
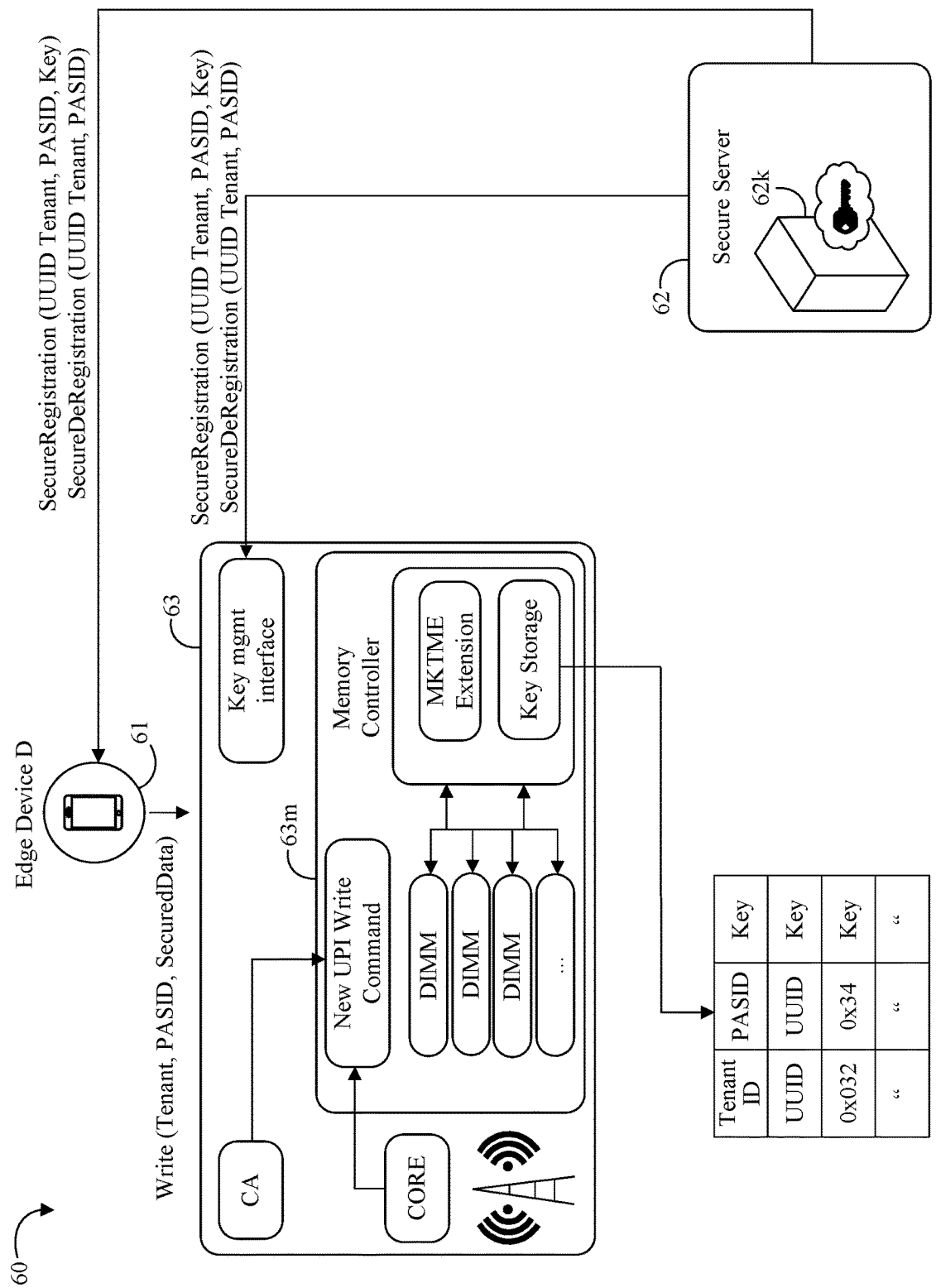
FIG. 6 is a block diagram of another example of an edge cloud environment according to an embodiment.

Turning now to FIG. 6, an embodiment of an edge cloud environment 60 may include one or more edge device(s) 61, a secure server 62, and one or more node(s) 63. The node 63 may include caching agents (CA) within the node 63 that process memory space requests from the cores within the same node 63. Cores may use a queue structure to store on-die-interconnect (ODI) requests that are sent to the CA. Home agents (HA) may be responsible for handling memory requests from the CAs and acting as a "home" for a part of the memory space. For example, one die may have multiple "homes" across which the system memory space physical addresses are distributed. A coherence domain or coherent domain may refer to groups of cores in a system together with memory spaces to which the groups can perform load and store operations, where the load of any location returns the most recent value sent to that location by another core or CA in the group. Ultra path interconnect (UPI), quick path interconnect (QPI), and Keizer technology interconnect (KTI) may refer to example inter socket high speed links over which requests or data may be forwarded from/to a core in a first socket to/from caches or HAs in a second socket in the node that implements a common coherency domain for the sockets.

Host fabric interface (HFI) may refer to an example inter-node high speed network interface, through which memory space requests are forwarded from a first or "local" node to a second or "remote" node, and through which data, messages, packets, etc. are sent back to the local node, by the second node through the latter's HFI. Multiple tiers of memory may be addressable within a coherent domain including DDR-based memory, high-bandwidth memory (HBM), 3D XPOINT memory, etc. A multi-node system or cluster may include two or more coherent domains between whom requests and responses are performed over their HFIs, network interface cards (NICs), etc. (e.g., for ETHERNET). Such requests and responses may travel through switches that route data between the communication devices/interfaces. For example, high-performance computing (HPC) or data centers may be composed by N clusters or servers that can communicate with each other using the fabric. Using the fabric, each coherent domain can expose some address regions to the other coherent domains. Memory controllers 63m may act as interfaces for the physical memories.

Some embodiments may provide improvements at a system level and a platform level. At a system level, for example, scale-out flows may be utilized to distribute the private keys that will be used afterwards by devices and platforms. To enable this, some embodiments may include a certified key generator server 62k (e.g., provided as part of the secure server 62 in FIG. 6, but may otherwise be a logically distinct entity provided on any suitable device in the edge cloud environment 60). At a platform level, for example, the platform may be modified in order to allow pass-through encrypted data to memory controllers, avoiding encryption memory logic.

The key server 62k may include technology to generate keys for a particular tenant and particular services (e.g., represented with a PASID) and distribute the keys to the set of devices that will be generating data for those services. The key server 62k may also distribute the keys to the platform (e.g., or multiple platforms in a distributed environment) where the service will run. For example, the server 62 may securely distribute the keys from the key to all the devices and platforms associated to the particular tenant. The tenants may be associated with a universally unique identifier (ULM). For example, the key server 62k may initiate a request to register a key for a particular tenant and service (e.g., SecureRegistration (UUID Tenant, PASID, Key), and may also initiate a request to deregister the same (e.g., SecureDeRegistration (UUID Tenant, PASID). Such requests may be sent to edge devices 61 and nodes 63. The edge devices 61 may include an interface to receive the private keys and also to encrypt the data sent to the edge platforms/nodes 63 using such keys.

At the platform level, some embodiments may include technology to expose an interface that can only be accessed in a secured and authenticated technique that is used by the key server 62k to register private keys associated to a particular service running on the platform represented by a given PASID. For example, on the node 63 the memory data encryption logic (e.g., a memory encryption engine) logic may include an interface to register a key for a particular PASID, a data structure that is used to store, for each given PASID, the corresponding key that has been associated by the key server 62k, and a memory/DMA operation type specifier, that can be used by the core to indicate that a particular memory write coming from a particular PASID is already encrypted and thus may bypass the MKTME encryption flow. The memory controller 63m will directly store the data to the corresponding memory DIMM. For example, the UPI protocol may be expanded in order to expose a new type of command to convey the new type of memory/DMA command. The CAs may be expanded to in order to support the new type of UPI messages. The ODI protocol between the core and the CA may be expanded to support the new type of IDI command. The core may also expose a new type of memory write interface to the application to use one or more aspects of the embodiments described herein.

ADDITIONAL NOTES AND EXAMPLES

Example 1 may include an electronic processing system, comprising a processor, memory communicatively coupled to the processor, a memory controller communicatively coupled to the processor and the memory to control access to the memory, the memory controller including encryption logic to encrypt at least a portion of the memory, and logic communicatively coupled to the memory controller to receive data with a unique identifier, and bypass the encryption logic of the memory controller based on the unique identifier.

Example 2 may include the system of Example 1, wherein the logic is further to register a private key associated with the unique identifier.

Example 3 may include the system of Example 2, wherein the logic is further to decrypt the data with the private key associated with the unique identifier.

Example 4 may include the system of any of Examples 2 to 3, wherein the logic is further to store a plurality of private keys respectively associated with a plurality of unique identifiers.

Example 5 may include the system of Example 1, wherein the logic is further to specify a memory operation type to the memory controller to write the data to the memory without further encryption.

Example 6 may include the system of any of Examples 1 to 5, wherein the unique identifier corresponds to a process application system identifier.

Example 7 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to receive data with a unique identifier, and bypass encryption logic of a media controller based on the unique identifier.

Example 8 may include the apparatus of Example 7, wherein the logic is further to register a private key associated with the unique identifier.

Example 9 may include the apparatus of Example 8, wherein the logic is further to decrypt the data with the private key associated with the unique identifier.

Example 10 may include the apparatus of any of Examples 8 to 9, wherein the logic is further to store a plurality of private keys respectively associated with a plurality of unique identifiers.

Example 11 may include the apparatus of Example 7, wherein the logic is further to specify a media operation type to the media controller to store the data without further encryption.

Example 12 may include the apparatus of any of Examples 7 to 11, wherein the unique identifier corresponds to a process application system identifier.

Example 13 may include the apparatus of any of Examples 7 to 12, wherein the logic coupled to the one or more substrates includes transistor channel regions that are positioned within the one or more substrates.

Example 14 may include a method of controlling a media, comprising receiving data with a unique identifier, and bypassing encryption logic of a media controller based on the unique identifier.

Example 15 may include the method of Example 14, wherein the logic is further to registering a private key associated with the unique identifier.

Example 16 may include the method of Example 15, wherein the logic is further to decrypting the data with the private key associated with the unique identifier.

Example 17 may include the method of any of Examples 15 to 16, wherein the logic is further to storing a plurality of private keys respectively associated with a plurality of unique identifiers.

Example 18 may include the method of Example 14, wherein the logic is further to specifying a media operation type to the media controller to store the data without further encryption.

Example 19 may include the method of any of Examples 14 to 18, wherein the unique identifier corresponds to a process application system identifier.

Example 20 may include the method of Example 19, further comprising sharing a private key associated with the process application system identifier with an edge device, a storage platform, and an execution platform.

Example 21 may include at least one computer readable storage medium, comprising a set of instructions, which when executed by a computing device, cause the computing device to receive data with a unique identifier, and bypass encryption logic of a media controller based on the unique identifier.

Example 22 may include the at least one computer readable storage medium of Example 21, comprising a further set of instructions, which when executed by the computing device, cause the computing device to register a private key associated with the unique identifier.

Example 23 may include the at least one computer readable storage medium of Example 22, comprising a further set of instructions, which when executed by the computing device, cause the computing device to decrypt the data with the private key associated with the unique identifier.

Example 24 may include the at least one computer readable storage medium of any of Examples 22 to 23, comprising a further set of instructions, which when executed by the computing device, cause the computing device to store a plurality of private keys respectively associated with a plurality of unique identifiers.

Example 25 may include the at least one computer readable storage medium of Example 21, comprising a further set of instructions, which when executed by the computing device, cause the computing device to specify a media operation type to the media controller to store the data without further encryption.

Example 26 may include the at least one computer readable storage medium of any of Examples 21 to 25, wherein the unique identifier corresponds to a process application system identifier.

Example 27 may include the at least one computer readable storage medium of Example 26, comprising a further set of instructions, which when executed by the computing device, cause the computing device to share a private key associated with the process application system identifier with an edge device, a storage platform, and an execution platform.

Example 28 may include a media controller apparatus, comprising means for receiving data with a unique identifier, and means for bypassing encryption logic of a media controller based on the unique identifier.

Example 29 may include the apparatus of Example 28, wherein the logic is further to means for registering a private key associated with the unique identifier.

Example 30 may include the apparatus of Example 29, wherein the logic is further to means for decrypting the data with the private key associated with the unique identifier.

Example 31 may include the apparatus of any of Examples 29 to 30, wherein the logic is further to means for storing a plurality of private keys respectively associated with a plurality of unique identifiers.

Example 32 may include the apparatus of Example 28, wherein the logic is further to means for specifying a media operation type to the media controller to store the data without further encryption.

Example 33 may include the apparatus of any of Examples 28 to 32, wherein the unique identifier corresponds to a process application system identifier.

Example 34 may include the apparatus of Example 33, further comprising means for sharing a private key associated with the process application system identifier with an edge device, a storage platform, and an execution platform.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with a media controller, comprising:
    one or more substrates; and
    logic coupled to the one or more substrates, wherein the logic is at least partly implemented in one or more of configurable logic and fixed-functionality hardware logic, the logic coupled to the one or more substrates to:
        receive data with a unique identifier,
        bypass encryption logic of the media controller based on the unique identifier, and
        share a private key associated with the unique identifier with one or more of an edge device, a storage platform, and an execution platform.

2. The semiconductor apparatus of claim 1, wherein the logic coupled to the one or more substrates is further to:
    share the private key with the edge device, the storage platform, and the execution platform.

3. The semiconductor apparatus of claim 1, wherein the logic coupled to the one or more substrates is further to:

register a private key associated with the unique identifier.

4. The semiconductor apparatus of claim 3, wherein the logic coupled to the one or more substrates is further to:
decrypt the data with the private key associated with the unique identifier.

5. The semiconductor apparatus of claim 3, wherein the logic coupled to the one or more substrates is further to:
store a plurality of private keys respectively associated with a plurality of unique identifiers.

6. The semiconductor apparatus of claim 1, wherein the logic coupled to the one or more substrates is further to:
specify a media operation type to the media controller to store the data without further encryption.

7. The semiconductor apparatus of claim 1, wherein the logic coupled to the one or more substrates includes transistor channel regions that are positioned within the one or more substrates.

8. An electronic processing system, comprising:
a processor;
memory communicatively coupled to the processor;
a memory controller communicatively coupled to the processor and the memory to control access to the memory, the memory controller including encryption logic to encrypt at least a portion of the memory; and
logic communicatively coupled to the memory controller to:
receive data with a unique identifier,
bypass the encryption logic of the memory controller based on the unique identifier, and
share a private key associated with the unique identifier with one or more of an edge device, a storage platform, and an execution platform.

9. The electronic processing system of claim 8, wherein the logic communicatively coupled to the memory controller is further to:
share the private key with the edge device, the storage platform, and the execution platform.

10. The electronic processing system of claim 8, wherein the logic communicatively coupled to the memory controller is further to:
register a private key associated with the unique identifier.

11. The electronic processing system of claim 10, wherein the logic communicatively coupled to the memory controller is further to:
decrypt the data with the private key associated with the unique identifier.

12. The electronic processing system of claim 10, wherein the logic communicatively coupled to the memory controller is further to:
store a plurality of private keys respectively associated with a plurality of unique identifiers.

13. The electronic processing system of claim 8, wherein the logic communicatively coupled to the memory controller is further to:
specify a memory operation type to the memory controller to write the data to the memory without further encryption.

14. A method of controlling a media, comprising:
receiving data with a unique identifier;
bypassing encryption logic of a media controller based on the unique identifier; and
sharing a private key associated with the unique identifier with one or more of an edge device, a storage platform, and an execution platform.

15. The method of claim 14, further comprising:
sharing the private key with the edge device, the storage platform, and the execution platform.

16. The method of claim 14, further comprising:
registering a private key associated with the unique identifier.

17. The method of claim 16, further comprising:
decrypting the data with the private key associated with the unique identifier.

18. The method of claim 16, further comprising:
storing a plurality of private keys respectively associated with a plurality of unique identifiers.

19. The method of claim 14, further comprising:
specifying a media operation type to the media controller to store the data without further encryption.

* * * * *